United States Patent

[11] 3,620,524

| [72] | Inventor | Joseph Czompi<br>1850 Williams Road, Columbus, Ohio 43207 |
|---|---|---|
| [21] | Appl. No. | 50,076 |
| [22] | Filed | June 26, 1970 |
| [45] | Patented | Nov. 16, 1971 |

[54] AUTOMOBILE WINDSHIELD INSTALLER
11 Claims, 5 Drawing Figs.

[52] U.S. Cl. .................................................. 269/21,
29/200 P, 29/267, 156/391, 269/59, 269/73,
269/79, 269/321 W
[51] Int. Cl. .................................................. B25b 11/02,
B23p 19/04, B25j 5/02
[50] Field of Search ................................................ 269/17, 21,
59, 71–73, 79, 321 W; 29/200 P, 239, 245, 267,
273; 156/391, 574; 157/1.1

[56] References Cited
UNITED STATES PATENTS

| 1,228,690 | 6/1917 | Monnet | 269/21 X |
|---|---|---|---|
| 2,014,535 | 9/1935 | Maca | 29/239 X |
| 2,147,907 | 2/1939 | MacChesney | 29/245 X |
| 2,629,584 | 2/1953 | Cannon | 29/267 X |
| 2,792,810 | 5/1957 | Maconeghy | 269/21 X |
| 3,130,103 | 4/1964 | Mattimoe | 156/391 |
| 3,482,438 | 12/1969 | Toyne | 269/17 X |

FOREIGN PATENTS

| 821,196 | 8/1937 | France | 269/21 |
|---|---|---|---|

*Primary Examiner*—Wayne A. Morse, Jr.
*Attorneys*—Jerome R. Cox and Frank H. Foster ABSTRACT: A workpiece holder is described for gripping an automobile windshield which has been shimmed with temporary spacer blocks in the windshield frame and for moving the windshield away from the frame so that windshield adhesive may be applied around the frame (or adhesive covering paper removed) and for subsequently returning the windshield to its exact original position in the windshield frame. The workpiece holder has a base for setting on the hood of an automobile and a carriage slidably mounted to the base. A pivot frame is pivotally mounted to the carriage and has windshield gripping means, including suction cups, pivotally mounted to the pivot frame. A lever mechanism and handle are linked to the pivot frame for pivoting the pivot frame in order to remove the windshield and replace it.

PATENTED NOV 16 1971 3,620,524

INVENTOR.
JOSEPH CZOMPI
BY
Jerome R. Cox
ATTORNEY

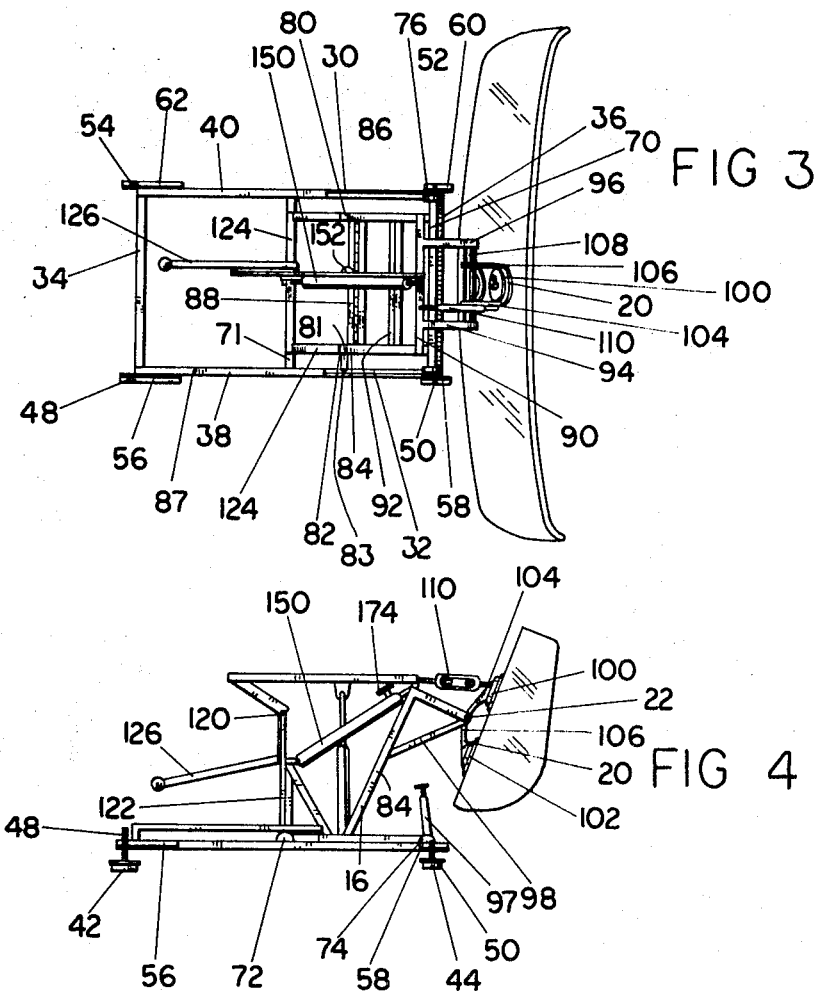
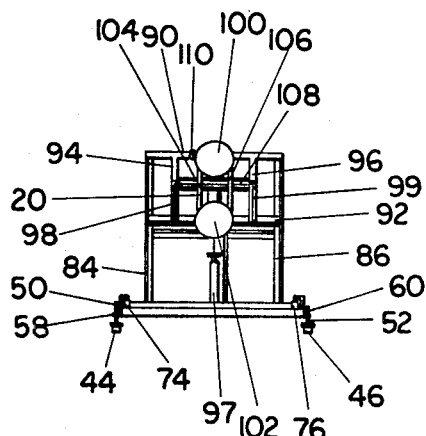

AUTOMOBILE WINDSHIELD INSTALLER

BACKGROUND OF THE INVENTION

The invention relates to a work holder for bringing parts into accurately assembled relationship, and more particularly relates to a windshield installer which is attached to a windshield which has been loosely shimmed in the windshield frame of an automobile, for removing the windshield from the frame to permit the application of suitable adhesive around the windshield frame (or alternatively removing the protective paper from adhesive previously applied), and for then returning the windshield to substantially the identical position and alignment in the windshield frame and against the adhesive.

Daily many automobiles suffer broken windshields. It is important to their owners that these windshields be replaced as quickly, inexpensively, and as effectively as possible. To remove a broken windshield, the framing strips are first removed from the frame and the broken pieces of glass are cleaned away. The frame is then cleaned of old bonding agent or adhesive so that a new adhesive may be neatly applied around the windshield frame. The new windshield must then be carefully and accurately positioned in the frame against this fresh adhesive. All these steps, except the positioning of the new windshield against the fresh adhesive, may be performed by one person. Positioning the new windshield glass is ordinarily a difficult job requiring at least two persons, one grasping each end of the windshield. These two persons must carefully position the new windshield in the frame and push it against the adhesive in precisely the proper position. Once the windshield contacts the adhesive, it cannot be removed or substantially repositioned or realigned within the frame. Once the adhesive contacts the windshield, the windshield will be held tightly in the position of contact.

The business of replacing windshields is often a small one-man business. All the steps in the operation of removing an old glass windshield and replacing it with new glass can be performed by a single person except for the step of positioning the windshield against the adhesive in the frame. The necessity of an additional employee merely for the purpose of positioning the windshield in the frame causes obviously excessive labor costs.

My invention not only enables a single person to completely install a windshield but also permits a single person to install the windshield with greater accuracy than heretofore possible even with two persons.

SUMMARY OF THE INVENTION

The invention is a workpiece holder for gripping a workpiece which has been placed in a selected position and for moving the workpiece away from that position; and subsequently, at a later time, returning the workpiece to the selected position. The workpiece holder comprises a base for setting on a support surface near the workpiece, and a pivot frame pivotally mounted either directly or indirectly to the base. A gripping means is pivotally mounted in turn to the pivot frame for alignment with and for gripping the workpiece. An angular locking means is connected to the gripping means for locking the gripping means in a selected angular orientation relative to the pivot frame.

Preferably, a carriage is movably mounted on the base and the pivot frame is pivotally mounted to the carriage and thereby to the base. The workpiece holder is positioned near the workpiece, the pivot frame and the gripping means are pivoted to seat against and grip the workpiece, and then the locking means may be locked to prevent further pivoting of the gripping means relative to the pivot frame. The pivot frame, with the workpiece mounted thereto, can then be pivoted away from the original workpiece position to move the workpiece away from its initial position. Later it may be pivoted in the opposite direction to return the workpiece to its original position.

An object of the above invention is to provide a workpiece holder useful in installing windshields.

A further object of the invention is to provide a workpiece holder which can be operated by a single operator in the installation and removal of windshields.

Another object of the invention is to provide a workpiece holder which more accurately returns a windshield to its proper position in a windshield frame.

DESCRIPTION OF THE DRAWINGS

FIG. 3 is a plan view of the apparatus of FIG. 1, but with the workpiece holder in a position intermediate the positions illustrated in FIG. 1 and FIG. 2;

FIG. 4 is a view in side elevation of the apparatus of FIG. 3 in the position of FIG. 3; and FIG. 5 is a front elevation of the apparatus of FIG. 3 in the position of FIG. 3 but with the windshield removed.

Figure 1:
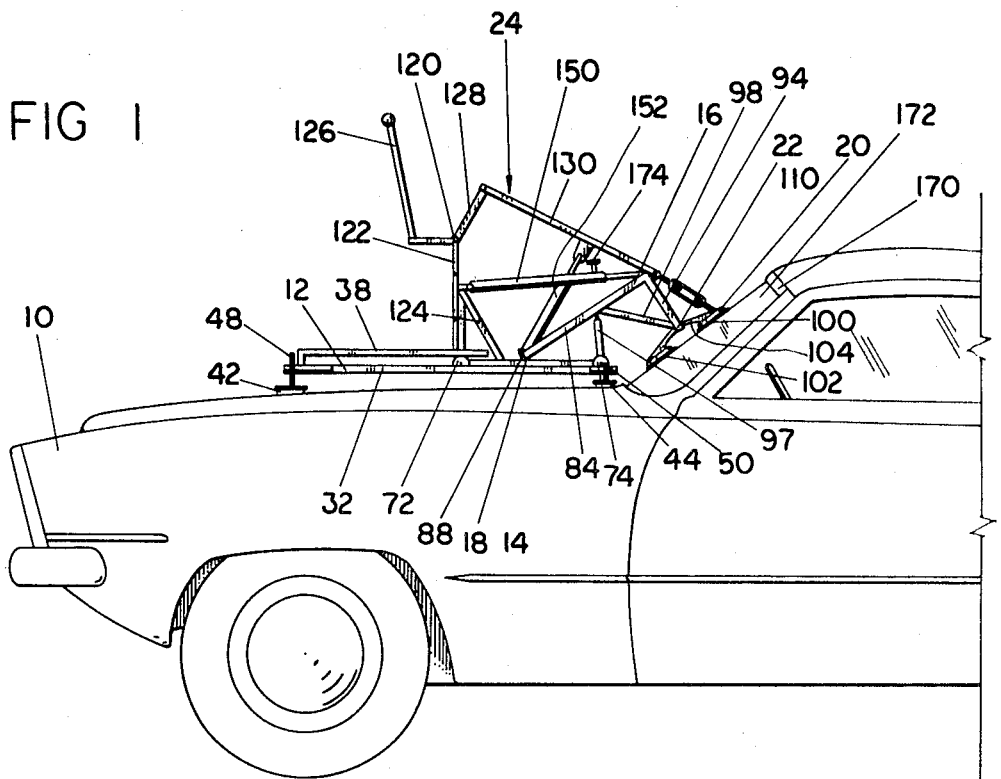
FIG. 1 is a view in side elevation of the preferred embodiment of the invention positioned on an automobile hood with the gripping means attached to the windshield and with the windshield in the windshield frame of the automobile.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

DETAILED DESCRIPTION

Figure 2:
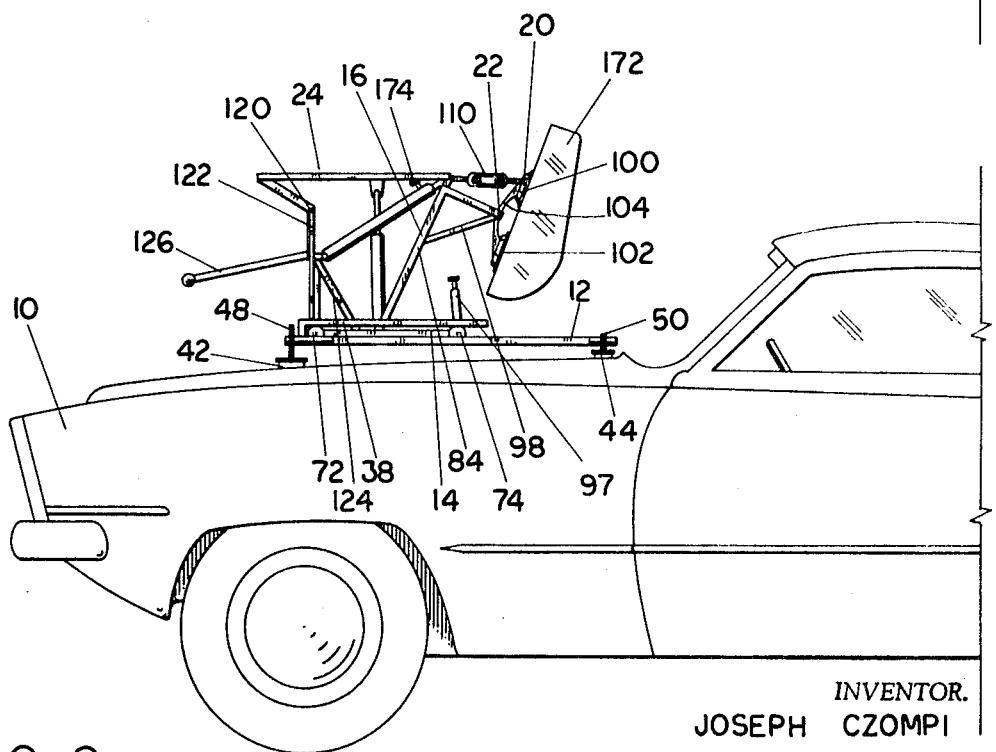
FIG. 2 is a view in side elevation of the apparatus of FIG. 1, but showing the workpiece holder, with the windshield attached thereto, in a position moved away from the windshield frame to permit preparation of the adhesive on the windshield frame.

In FIGS. 1 and 2, an automobile 10 is shown on which a preferred embodiment of the invention is mounted for operation. Generally described, the preferred embodiment has a base 12 on which a carriage 14 is slidably mounted. A pivot frame 16, appearing somewhat L-shaped, is mounted to the carriage 14 for pivotal movement around an axis 18. A gripping means 20 is pivotally mounted to the pivot frame 16 for pivotal movement around an axis 22. A lever mechanism 24 is provided for lifting the pivot frame 16 from the position illustrated in FIG. 1 upwardly to the position illustrated in FIG. 2.

Referring now to all of the figures for a more detailed description, the primary structural material from which the preferred embodiment is constructed is ordinary right-angle structural steel. The base 12, as best seen in FIG. 1 and FIG. 3, has a pair of longitudinal lower track members 30 and 32 connected at their ends to a pair of lateral members 34 and 36. The base 12 also has a pair of cooperating upper track members 38 and 40 mounted above the lower track members 32 and 34 for retaining rollers in the track as described below. The base is also provided with four antiscratch support feet, such as feet 42, 44, and 46, each of which is adjustably mounted to the base 12 by means of threaded rods 48, 50, 52 and 54. These threaded rods are threadedly engaged to four angle brackets 56, 58, 60 and 62 which are welded to the corners of the base 12. The four support feet may be vertically adjusted so that the base 12 will rest in a substantially horizontal position on the hood of an automobile as shown.

The carriage 14 has a pair of lateral members 70 and 71 (see FIG. 3) with rollers rotatably mounted at each end thereof. These rollers 72, 74, 76, and a fourth (not visible), roll along the lower track members 30 and 32. The carriage 14 is also provided with a pair of longitudinal structural members 80 and 82 spaced inwardly from the rollers (such as, for example, rollers 72 and 74). A lug 81 (see FIG. 3) is welded to the carriage and extends horizontally from it above the lower longitudinal track member 32. A hole 83 in the lug 81 registers with a similar hole beneath it in the track member 32 when the carriage 14 is in the forward position of FIG. 1. A pin or nail may be inserted through these holes to retain the carriage 14 in this position. The carriage 14 may also be slid on its rollers to the position illustrated in FIG. 2. A suitable hole 87 is similarly provided in the lower track member 32, and a similar hole in the upper track member 38 registers with the hole 83 in the lug 81 when the carriage is in the position of FIG. 2. Similarly, a pin may be inserted in these holes to lock the carriage 14 in the position of FIG. 2.

The pivot frame 16 comprises a pair of radial members 84 and 86 butt welded at one end of each to a hinge member 88. A top lateral cross member 90 and an intermediate lateral cross member 92 are welded between the radial members 84 and 86. Extending perpendicularly from the top cross member 90 are a pair of support beams 94 and 96 which are braced by brace members 98 and 99. A vertically adjustable support pedestal 97 extends upwardly from the carriage 14 to receive the intermediate lateral cross member 92 and thereby support the pivot frame 16.

The gripping means 20 comprises a pair of suction cups 100 and 102 which are rigidly attached to a parallel pair of suction cup arms 104 and 106 which in turn are pivotally mounted to the pivot frame 16 by means of an axle 108 positioned at the axis 22. A turnbuckle 110 is connected between the suction cup arm 104 and the pivot frame 16 to provide an angular locking means. Adjustment of the turnbuckle adjusts the angular orientation of the gripping means in the selected angular position.

The lever mechanism 24 has a fulcrum pin 120 at the upper end of a fulcrum beam 122 which is rigidly mounted to the rear of the carriage 14 by means of support structure 124. The lever mechanism 24 comprises a handle 126 rigidly attached to a bell crank 128 which is pivotally mounted to the top of the fulcrum beam 122 at the fulcrum pin 120. A linkage beam 130 is pivotally attached to the opposite end of the bell crank 128 and extends to a connection at the top of the pivot frame 16. The handle 126 may be rotated in a counterclockwise direction in FIG. 1 to raise the pivot frame from the lowered position of FIG. 1 to the raised position of FIG. 4. A pair of spring biased dampers 150 and 152, similar to door closers, are provided for counterbalancing the effect of gravity and for preventing jerky movements of the windshield. One spring biased damper 150 is connected between the top lateral member 90 of the pivot frame 16 and the top of the bracing member 124 of the fulcrum beam 122. The spring biased damper 150 urges the pivot frame 16 in FIG. 1 in a counterclockwise direction. The other spring biased damper 152 is connected between the linkage member 130 and the hinge member 188 of the pivot frame 16.

The operation of the preferred embodiment of the invention is preceded by the removal of the old glass from the automobile and the removal of the framing strip 170. The frame is then cleaned and, when a calking gun type of adhesive is used, a single person may then position the windshield in the windshield frame using positioning blocks to shim the windshield in its ultimately desired position. When this has been completed, the operator positions the preferred embodiment of my workpiece holder on the hood of the automobile in the position shown in FIG. 2. The carriage 14 is then slid along the track members 30 and 32 to a forward position near the windshield 172. The handle 126 is now lifted and rotated in a clockwise direction thereby pivoting and lowering the pivot frame 16 and the gripping means 20 down toward the windshield 172. The turnbuckle 110 may be adjusted so that both suction cups may seat against and grip the windshield 172. The preferred embodiment is then in the position illustrated in FIG. 1.

The operator now rotates the handle 126 in a downward counterclockwise direction to move the windshield upwardly out of its windshield frame by rotating the pivot frame 16 to the position illustrated in FIG. 4. A locking member 174 provided on the spring biased damper 150 is now tightened to rigidly retain the pivot frame 16 at the angular orientation relative to the carriage 14 which is illustrated in FIG. 4. The upper track members 38 and 40 prevent tilting of the carriage 14. The pin is now removed from the lug 81 and the carriage may be slid away from the windshield frame so that the preferred embodiment is moved to the position illustrated in FIG. 2. A pin or nail is then inserted in the hole 87 and through the lug 81. The windshield 172 then remains in the position illustrated in FIG. 2 while the operator is free to apply the proper adhesive either around the windshield frame or around the edge of the windshield.

After the proper adhesive has been applied to the windshield or the windshield frame, the sequence of events is the reverse of those described above. The latching pin is removed from the hole 87 so that the carriage may be slid from its position illustrated in FIG. 2 to a position illustrated in FIG. 3. The latching pin is then reinserted in the lug 81. The operator loosens the locking screw 174 on the spring biased damper 150 and rotates the handle 126 in a clockwise direction to lower the pivot frame 16 and the windshield 172 to the proper position in the windshield frame. The workholder, and therefore the windshield, is returned to the exact original position it was initially in when the suction cups 100 and 102 were originally attached to the windshield 172. The windshield contacts the adhesive in the proper position.

A preferred method of operation involves the use of a 15 foot adhesive strip having one side protected by paper. Such strips may be procured in various ways. For example, I have obtained such an adhesive strip in roll form in an auto glass replacement kit furnished under the trade name of "Trem Shield." Other manufacturers manufacture similar paper protected strips either in similar kits or separately under various trade names.

When the preferred adhesive strip is to be used, I remove the old glass and the framing strip from the windshield frame, then clean the frame. Then the adhesive strip is applied to the frame with the protected paper covered side outward. I then, by myself, position the windshield glass in the frame using positioning blocks to shim the windshield in its preferred position. Then I position the preferred embodiment of my workpiece holder on the automobile hood, slide the carriage 14 forward as described above, and pivot and lower the pivot frame 16 so that the suction cups grip the windshield, also as described above. I then rotate the handle 126 to move the windshield upwardly out of its frame to the position shown in FIG. 4. The locking member 174 is tightened. The pin is removed from lug 31 and the carriage is slid away to the position of FIG. 2 and the pin is inserted through hole 87 and lug 81. Then I remove the protective paper from the adhesive on the windshield frame. Then the sequence of events is reversed, as described in the second paragraph above. The windshield is thus attached to the frame in the exact desired position.

It is to be understood that while the detailed drawings and specific examples given describe preferred embodiments of my invention, they are for the purposes of illustration only, that the apparatus of the invention is not limited to the precise details and conditions disclosed, and that various changes may be made therein without departing from the spirit of the invention which is defined by the following claims.

I claim:

1. A workpiece holder for gripping a workpiece which has been placed in a selected position, and for moving the workpiece away from that position, and subsequently returning the workpiece to the selected position, the holder comprising:
   a. a base for setting on a support surface near the workpiece;
   b. a pivot frame pivotally mounted to the base;
   c. gripping means pivotally mounted to the pivot frame for alignment with and for gripping of the workpiece; and
   d. angular locking means for locking the gripping means in a selected angular orientation relative to the pivot means;
   wherein the holder may be positioned near the workpiece, the pivot frame and the gripping means pivoted to grip the workpiece, the locking means may be locked to prevent further pivoting of the gripping means, and the pivot frame with the workpiece mounted thereto can be pivoted to move the workpiece away from and subsequently back to its initial position.

2. A workpiece holder according to claim 1,
   wherein a carriage is movably mounted on the base and the pivot frame is pivotally mounted to the carriage.

3. A workpiece holder according to claim 2,
   wherein a track is provided on the base and the carriage is mounted to slide along said track.

4. A workpiece holder according to claim 3,
   wherein in the operating position of the holder the track is substantially horizontal, the pivot axes for the gripping means and the pivot frame are substantially parallel, substantially horizontal, and substantially perpendicular to said track.

5. A holder according to claim 4,
   wherein the gripping means comprises a pair of suction cups.

6. A holder according to claim 4,
   wherein the pivot frame is resiliently biased relative to the carriage to pivotally urge the pivot frame in a direction opposite the net gravitational moment exerted on the pivot frame to provide a counterbalance.

7. A holder according to claim 4,
   wherein a lever means is mounted to the carriage for grasping by an operator for pivoting the pivot frame relative to the carriage.

8. A holder according to claim 4,
   wherein the angular locking means comprises a turnbuckle connected at one end to said pivot frame and at the opposite end to the gripping means.

9. A holder according to claim 2,
   wherein the workpiece is an auto windshield which is to be temporarily removed and then returned to its initial position in the auto and wherein a. the base is a frame having a track for slidably receiving the rollers of a carriage and the base has antiscratch feet for supporting the holder on an auto body;
   b. the carriage comprises a carriage frame having the pivot frame pivotally mounted thereto for pivotal movement around a first axis, the pivot frame being spring biased for urging the lifting of the windshield from its initial position, the carriage having rollers rotatably mounted thereto, slidably cooperating with the track to permit longitudinal sliding of the carriage along the base;
   c. the gripping means comprises a pair of suction cups mounted to a suction cup arm, the suction cup arm mounted to the pivot frame for pivotal movement around a second axis which is substantially parallel to said first axis;
   d. the locking means is a turnbuckle connected at one end to said first frame and at its opposite end to the suction cup arm; and
   e. a lever means is pivotally mounted at its fulcrum to the carriage and is linked to the pivot frame for obtaining a mechanical advantage in pivoting the pivot frame relative to the carriage and including latching means for removably latching the pivot frame in the removed position of the windshield.

10. A holder according to claim 9,
    wherein a latching means is provided for latching the carriage in a selected position on the track.

11. A holder according to claim 9,
    wherein the track comprises a pair of lower, parallel track members and a cooperating pair of upper track members fixed above the lower track members for retaining the rollers of the carriage against vertical movement away from the lower track members.

* * * * *